A. E. BACON.
MIXING VALVE.
APPLICATION FILED SEPT. 4, 1909.

1,190,620.

Patented July 11, 1916.
2 SHEETS—SHEET 1.

WITNESSES:
Jas. C. Wobensmith
Mae Hofmann

INVENTOR
Albert E. Bacon,
BY
Geo. F. Croasdale
ATTORNEY.

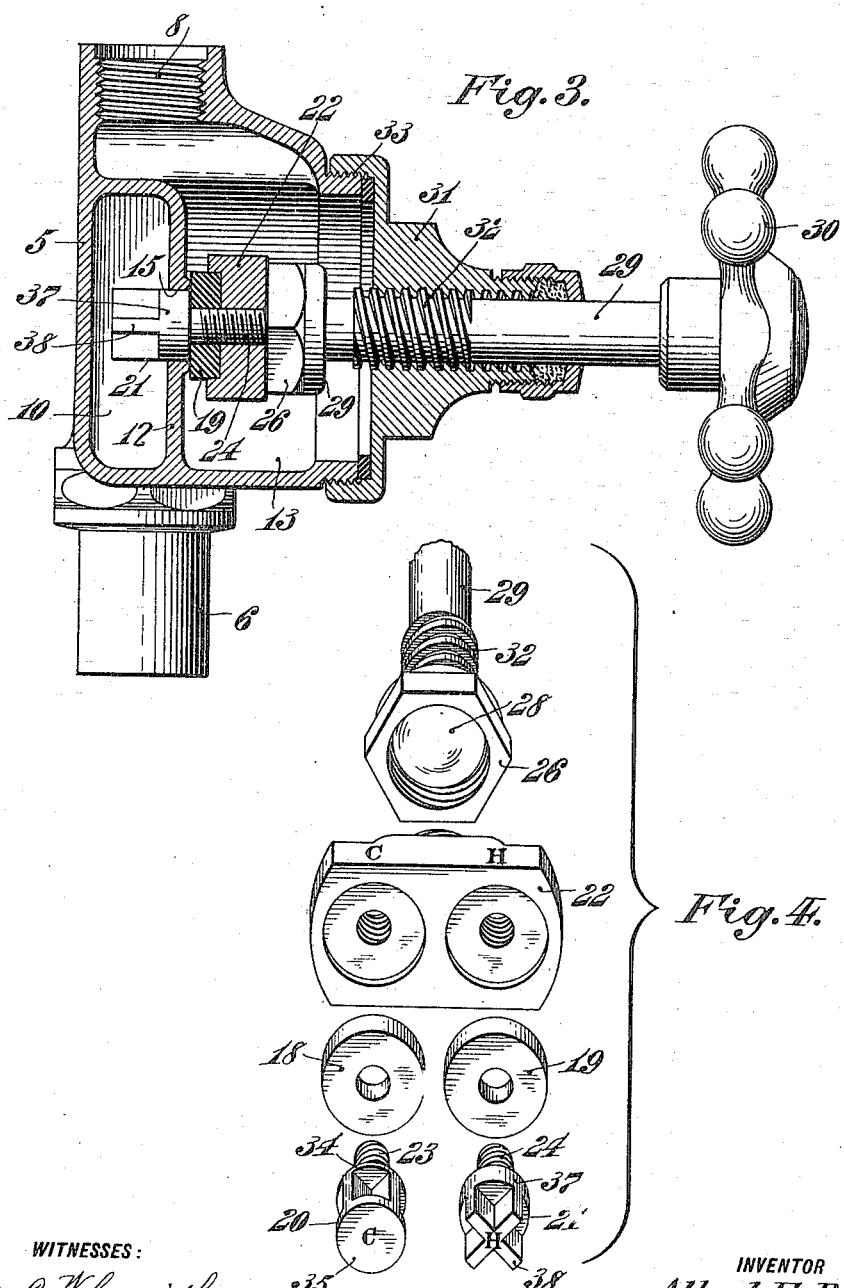

UNITED STATES PATENT OFFICE.

ALBERT E. BACON, OF GERMANTOWN, PENNSYLVANIA, ASSIGNOR TO HAINES, JONES & CADBURY INCORPORATED, A CORPORATION OF PENNSYLVANIA.

MIXING-VALVE.

1,190,620.         Specification of Letters Patent.         Patented July 11, 1916.

Application filed September 4, 1909. Serial No. 516,279.

*To all whom it may concern:*

Be it known that I, ALBERT E. BACON, a citizen of the United States, residing at Germantown, in the county of Philadelphia, State of Pennsylvania, have invented a new and useful Mixing-Valve, of which the following is a specification.

My invention relates to improvements in mixing valves.

My object is to provide improved means for controlling the flow of two or more fluids to a common mixing chamber, for example, hot and cold water, by the operation of a single valve stem.

My invention comprises improvements in means for movably securing the valve piston yoke to the operating stem, so that the same will be capable of a rocking motion relative thereto.

My invention also comprises improvements in the structure of the valve body, and the relative positions of the inlets and outlets, and also improvements in other details in construction and arrangement of the several parts.

Figure 1:
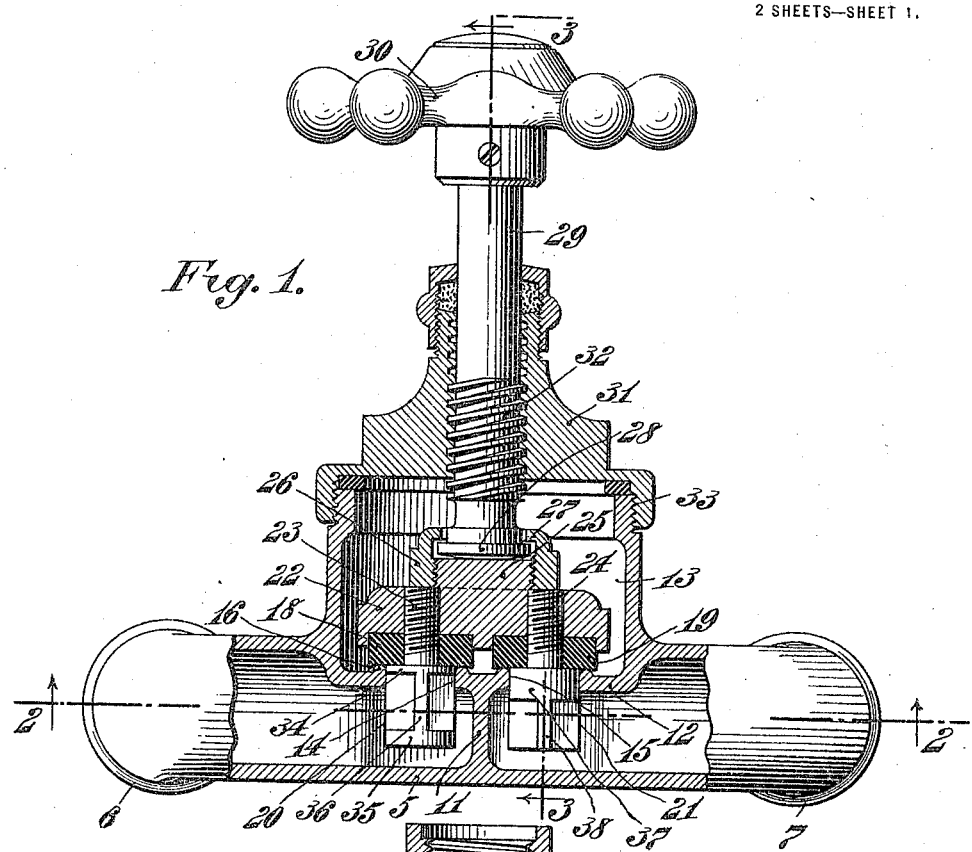
Figure 2:
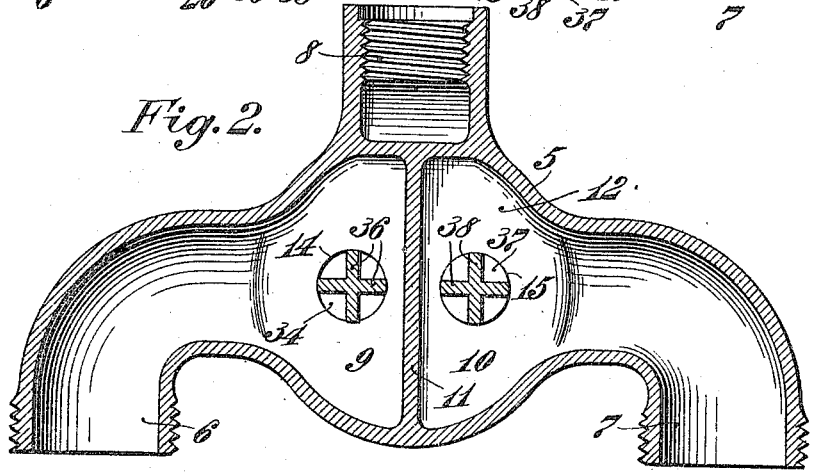

Referring to the drawings: Figure 1 is a horizontal section through the middle of the structure. Fig. 2 is a vertical section on line 2—2 of Fig. 1. Fig. 3 is a vertical section through line 3—3 of Fig. 1. Fig. 4 is a perspective view of the valve pistons, washers and yoke, disassembled.

Similar numerals refer to similar parts throughout the several views.

The valve member or casing 5 is provided with the intake openings 6 and 7 for example, one for hot water and the other for cold, and the outlet or discharge opening 8 for the mixture. Inlet 6 communicates with chamber 9, while inlet 7 communicates with chamber 10, said chambers being divided by partition 11. Transverse to partition 11, is the partition 12, which separates the inlet chambers 9 and 10 from the common mixing chamber 13. Mixing chamber 13 communicates with the discharge 8. In partition 12 are located the valve ports 14 and 15, both lying in the same horizontal plane and around the margins of which are provided the annular ridges 16 for efficient coöperation with the washers 18 and 19, which are connected with the valve pistons 20 and 21. These valve pistons and washers are connected rigidly to the yoke 22 by the threaded stems 23 and 24 respectively.

Yoke 22 is provided with the threaded lug 25 which coöperates with the interiorly threaded sleeve 26 having the contracted portion or inwardly extending rim 27, which engages the head 28 of spindle 29 carrying the hand wheel 30. This spindle 29 is threaded through the cap 31 as indicated at 32, while the cap or bonnet 31 is threaded onto the valve body 5, as at 33, thus closing the mixing chamber 13. It is to be noted that the pitch of the threading 32 is sharp to secure the rapid movement of the valve pistons. Considering the valve in the closed position it will be noted that the pistons are differently constructed. For example, piston member 20 is provided with an extremely thin cylinder or disk portion 34, which is seated in the port 14, while at the other end of the structure is a cylinder or disk portion 35 of greater thickness. These two disks or cylinders are connected by the wings 36 for guiding the piston member in the port.

Piston member 21 is provided with a single disk or cylinder 37 of considerable extension, seated in port 15. From this disk or cylinder 37 extend into chamber 10 the wings 38 for guiding said piston member in port 15. The piston members are provided with the washers 18 and 19 respectively, one of which surrounds spindle 23 and one spindle 24. These spindles 23 and 24 are threaded into threaded openings in yoke member 22 pressing the washers 18 and 19 firmly between the piston and yoke. The washers are preferably seated in countersunk recesses in the yoke 22 concentric with the threaded openings therein, as clearly shown in Figs. 1 and 3, so that the said washers, piston members and yoke form one rigid structure.

It will be noted from an inspection of Fig. 1 of the drawings that the end of the head 28 of spindle 29 is slightly convex, and that play is allowed for the head in the sleeve 26, so that, while the two piston members and yoke 22 are operatively rigid, the relative movement permitted between yoke 22 and spindle 29, permits the proper seating of both pistons in their respective valve apertures and the proper coöperation of washer 18 with annular rim 16 and washer 19 with annular rim 17.

Disk 34 is provided to prevent leakage through port 14. For example, if washer 19 of port 15 should be badly worn, the rocking movement of yoke 22 would obviously cause piston 21 to descend a little lower than piston 20; or, if dirt or gravel should collect around ridge 16 of port 14, the rocking movement would again cause piston 21 to descend a little lower than piston 20. In either case, leakage is effectually prevented by disk 34 which completely fills the port. It will also be understood that disks 34 and 37 comprise supports for washers 18 and 19 and tend to maintain the same in a flat or normal condition; thus serving to prevent leakage through ports 14 and 15 and to prolong the period of usefulness of the washers.

This device is especially adapted for controlling the flow of hot and cold water to a shower bath, and serves to prevent any flow of hot water to the shower until the cold water has been admitted thereto, thus preventing accidental scalding.

It will be noted from an inspection of Fig. 3 that the mixing chamber 13 curves around the diaphragm 12 so that the delivery port 8 from said mixing chamber has an axis in the same plane as the axes of ports 6 and 7. This construction permits the formation of the exterior surfaces of valve member 5 and inlets 6 and 7 and discharge 8, on the side away from hand wheel 30, all in the same horizontal plane. This makes an extensive flat surface for securing the device against the wall which is always convenient. It will also be noted that that part of the flat exterior surface which comprises discharge 8 is so disposed that when undue downward strain is exerted upon the hand wheel, discharge 8 will be forced against the wall, thereby lessening the strain upon inlets 6 and 7 and their connections. This disposition of the parts is obviously of particular importance when the device is intended for use in connection with shower baths in school gymnasiums and the like, as in such cases it is apt to be subjected to severe strain by boys hanging upon the hand wheel.

To insure the proper assembling of the hot and cold water valve pistons in their respective valve ports, the pistons are marked with the letters C and H respectively, also these letters are placed upon the yoke adjacent the points of securing said pistons thereto.

The operation of my device is as follows: In the specific structure illustrated in the drawings, as one embodiment of my invention, piston 20 is adapted to control the flow of cold water, while piston 21 is adapted to control the flow of hot water. In the position shown in Fig. 1, both valves are closed so that no water can flow through the device. Upon turning the hand wheel 30 in the counterclockwise direction, the spindle 29 is moved, causing washer 18 to move away from the annular rib 16 and cylinder 34 of piston 20 to move out of the valve port 14. This permits the flow of cold water only into the mixing chamber 13 and from mixing chamber 13, through outlet 8, to the shower. It will be noted that a considerable movement of cylinder 34 is permitted by the counterclockwise turning of hand wheel 30 before cylinder 37 of the hot water valve leaves the valve port 15, so that a full flow of cold water is admitted to the shower, before any hot water is admitted thereto. A further turning of the hand wheel 30, in the counterclockwise direction, finally carries cylinder 37 out of valve port 15, permitting hot water also to flow into mixing chamber 13. Here the hot and cold water flowing into mixing chamber 13 are mixed and water of resultant temperature flows through 8 to the shower. A continued turning of the hand wheel in the counterclockwise direction carries cylinder 37 farther away from valve port 15 increasing the flow of hot water into the mixing chamber 13. It is obvious that the point can be reached in which the flow of hot water and the flow of cold water is equal, and a further turning, in the counterclockwise direction, of hand wheel 30, causes the cylinder 35 first to approach and then to close the port 14 in which position the cylinder 37 being entirely out of and away from port 15, the hot water will be turned on full head while the cold water is entirely shut off. It will thus be seen that from the closed position of the valve, water can only be admitted, first through the cold water pipe, and then, after a substantial flow of cold water is passing through the valve, hot water can gradually be admitted into the mixing chamber to be mixed with the cold water and pass through the valve, and thereupon by the proper manipulation of the hand wheel 30 the exact temperature of the water desired can be readily secured.

What I claim is:—

1. In a mixing valve, the combination of a chambered body having separate inlet chambers, a common mixing chamber and ports between the inlet chambers and the mixing chamber; a spindle, a yoke provided on one side with a threaded lug and on the other side with piston members operating in the ports between the inlet chambers and the mixing chamber, said piston members being threaded into the yoke and provided at the ends toward the yoke with pistons adapted to be moved without or within the margins of the ports to control communication therethrough, washers between the pistons and the yoke, and a threaded sleeve on the threaded lug having a loose engagement with the spindle adapted to permit of relative movement between spindle and pistons.

2. In a valve having separate inlet chambers, a common mixing chamber and ports between the inlet chambers and the mixing chamber, the combination of a spindle, a yoke provided on one side with a threaded lug and having threaded recesses in the opposite side and countersunk recesses surrounding the same and concentric therewith, piston members operating in the ports between the inlet chambers and the mixing chamber, said piston members being threaded into the recesses in the yoke and provided at the ends toward the yoke with pistons adapted to be moved without or within the margins of the ports to control communication therethrough, washers seated in said countersunk recesses, between the pistons and the yoke, and a threaded sleeve between the threaded lug and the spindle adapted to permit of relative movement between spindle and pistons.

3. The combination in a valve having separate inlet chambers, a common mixing chamber and ports between the inlet chambers and the mixing chamber, of a bonnet provided with a screw-threaded opening, one side of the bonnet forming a portion of the mixing chamber wall, a spindle threaded in said bonnet, a yoke movably connected with the spindle and extending across said ports, entirely on the mixing chamber side of the same, to points short of or removed from the mixing chamber wall, piston members rigidly connected with the yoke, said piston members provided at corresponding ends with pistons fitting closely within the ports and normally closing the same, one piston member having a piston projecting a shorter distance into its port than the piston of the other member and provided at its opposite end with an additional piston, and washers between the yoke and the adjacent pistons.

4. In a mixing valve, the combination of a chambered body having separate inlet chambers, a common mixing chamber and ports between the inlet chambers and the mixing chamber, a spindle, a yoke provided on one side with a threaded lug and on the other side with piston members operating in the ports between the inlet chambers and the mixing chamber, said piston members being threaded into the yoke and provided at the ends toward the yoke with pistons adapted to be moved without or within the margins of the ports to control communication therethrough, one piston member having a piston projecting a shorter distance into its port than the piston of the other member and provided at its opposite end with an additional piston, washers between the pistons and the yoke, and a threaded sleeve on the threaded lug having a loose engagement with the spindle adapted to permit a relative movement between spindle and pistons.

ALBERT E. BACON.

Witnesses:
 MAE HOFMANN,
 E. H. WAUGH.

Copies of this patent may be obtained for five cents each, by addressing the "Commissioner of Patents, Washington, D. C."